3,346,621
REACTION OF TETRAFLUOROHYDRAZINE WITH UNSATURATED ESTERS OF ACRYLATES AND METHACRYLATES

Robert C. Petry and Samuel F. Reed, Jr., Huntsville, Ala., assignors to Rohm & Haas Company, Philadelphia, Pa., a corporation of Delaware
No Drawing. Filed June 22, 1962, Ser. No. 206,542
4 Claims. (Cl. 260—482)

This invention concerns polymerizable monomers which are monoethylenically unsaturated and which contain bis(difluoramino) substituents. More specifically, it concerns the products which are prepared by the reaction of tetrafluorohydrazine, $N_2F_4$, with the unsaturated esters of acrylates and methacrylates.

The products of the present invention, being monoethylenically unsaturated and containing bis(difluoramino) substituents, are polymerizable, and the polymers therefrom have high energy. They are suitable as high energy binders for propellant compositions, normally being used in conjunction with an oxidizer such as ammonium perchlorate, ammonium nitrate, or other solid oxidizers, well-known to those skilled in the art.

In carrying out the present invention, it is preferred to conduct the reaction in the vapor phase, and a mixture of the acrylate or methacrylate, tetrafluorohydrazine, and an inert gas, such as helium or nitrogen, is passed through a copper reactor coil and the product is collected in a cooled receiver.

Typical of the unsaturated acrylate and methacrylate esters which are employed are vinyl, allyl and methallyl acrylates and methacrylates.

As inert diluents, nitrogen, helium and argon can be employed.

The reaction temperature will vary depending on the reactivity of the particular monomer being employed, but will be in the 150° to 350° C. range, with the temperature of 200° to 250° C. being preferred.

Since the product is a polymerizable monomer, the residence time in the reactor is important, and will vary from 0.30 to 1.25 minutes depending on the reactivity of the product. A residence time of about 0.30 to 0.40 minute is preferred.

By using the preferred short residence times in the reactor, it has been found that only the mono-adducts are obtained. Suprisingly, however, the addition of $N_2F_4$ to the double bonds to give bis(difluoramino) adducts is not specific, and a mixture, approximately in equal portions, of the two mono-adducts is obtained. For example, with vinyl acrylate, approximately one-half of the $N_2F_4$ will add to the vinyl moiety of the molecule and the other half will add to the acrylate moiety. Thus, there is obtained a mixture of monoethylenically unsaturated monomers which can be copolymerized to form a usable copolymer in which both the reacting monomers are mutually compatible.

Depending on the properties required in the finished product, these monomers may be copolymerized with other ethylenically unsaturated monomers. They may be internally plasticized by copolymerization with monomers such as methyl, ethyl and butyl acrylates and 2-ethylhexyl acrylate may also be used for the same purpose. If harder products are desired, then they may be copolymerized with monomers such as methyl methacrylate, styrene and vinyl toluene.

If a cross-linked product is desired, the monomers of the present invention may be copolymerized with polyethylenically unsaturated monomers, such as divinylbenzene, trivinylbenzene, divinylnaphthalene, divinoxyethane and trivinoxypropane.

The copolymers of acrylates and methacrylates, such as described above, are well-known to those skilled in the art, and the methods of preparation thereof are also well-known.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

The results of a number of experiments are tabulated in Table I and the characterization of representative reaction products is seen in Table II:

TABLE I.—EXPERIMENTAL DATA FOR THE REACTION OF TETRAFLUOROHYDRAZINE WITH DIOLEFINS IN THE ACRYLATE AND METHACRYLATE SERIES

| Olefin (g.) | Helium Flow rate (ml./min.) | $N_2F_4$ Flow rate (ml./min.) | Olefin Flow Rate (ave. ml./min.) | Temp., °C. | Results, g. adduct mixture |
|---|---|---|---|---|---|
| Vinyl Acrylate (14.39) | 25 | 10 | 0.18 | 245 | 2.3 |
| Do | 35 | 25 | 0.14 | 235 | 3.9 |
| Do | 40 | 15 | 0.15 | 235 | 3.1 |
| Vinyl Methacrylate (14.59) | 20 | 25 | 0.19 | 250 | 6.45 |
| Do | 35 | 30 | 0.13 | 230 | 10.2 |
| Allyl Acrylate (13.76) | 50 | 25 | 0.18 | 245 | 3.53 |
| Allyl Methacrylate (14.08) | 50 | 25 | 0.13 | 230 | 8.55 |
| Methallyl Acrylate (13.0) | 40 | 60 | 0.10 | 225 | 1.36 |
| Methallyl Methacrylate (13.6) | 45 | 60 | 0.20 | 235 | 2.96 |

TABLE II.—CHARACTERIZATION DATA ON ADDUCT MIXTURES

| Diolefin | Boiling Point, °C./mm. | Percent C | | Percent H | | Percent N | | Percent F | |
|---|---|---|---|---|---|---|---|---|---|
| | | Calc. | Found | Calc. | Found | Calc. | Found | Calc. | Found |
| Vinyl Acrylate | 64–66/24 | 29.7 | 31.33 / 31.26 | 2.97 | 3.10 / 3.04 | 13.75 | 13.69 / 13.95 | 37.65 | 33.30 / 34.32 |
| Vinyl Methacrylate | 68/28 | 33.25 | 34.96 | 3.71 | 3.89 | 12.96 | 12.55 | 35.18 | 33.48 |
| Allyl Acrylate | 46–48/3 | 33.25 | 34.76 | 3.71 | 3.67 | 12.96 | 13.32 | 35.18 | 33.95 |
| Allyl Methacrylate | 46–47/1 | 36.52 | 37.30 | 4.35 | 4.43 | 12.17 | 11.85 | 33.03 | 31.53 |
| Methallyl Acrylate | 41/1 | 36.52 | 37.29 | 4.35 | 4.38 | 12.17 | 12.03 | 33.03 | 28.43 / 31.50 |
| Methallyl Methacrylate | 60/3 | 39.26 | 40.56 | 4.91 | 5.00 | 11.47 | 11.42 | 31.14 | 28.96 |

We claim:
1. A process for the preparation of polymerizable monomers containing bis(difluoramino) groups which comprises reacting
 (A) tetrafluorohydrazine, with
 (B) a monomer selected from the group consisting of vinyl, allyl and methallyl esters of acrylic and methacrylic acids.
2. A process as set forth in claim 1 in which the reaction is conducted by passing the reactants through a copper reactor coil at a temperature of from 150° C. to 350° C.
3. A process as set forth in claim 2 in which the residence time in the reactor coil is from 0.30 to 1.25 minutes.
4. A process as set forth in claim 3 in which the reaction mixture is diluted with an inert gas selected from the group consisting of nitrogen, helium and argon.

No references cited.

RICHARD K. JACKSON, *Primary Examiner.*

L. D. ROSDOL, *Examiner.*

A. HALLUIN, *Assistant Examiner.*